Jan. 25, 1966 L. V. WISE ETAL 3,230,808

AUTOMATIC TRIMMER FOR EDGE-PUNCHED CARDS

Filed Nov. 9, 1962 4 Sheets-Sheet 1

INVENTORS
LESTER V. WISE
RICHARD HERMANOWSKI
DANIEL MANTELL
BY [signature]
ATTORNEY

AUTOMATIC TRIMMER FOR EDGE-PUNCHED CARDS

Filed Nov. 9, 1962 4 Sheets-Sheet 2

INVENTORS
LESTER V. WISE
RICHARD HERMANOWSKI
DANIEL MANTELL
BY
Michael Ebert
ATTORNEY Jan. 25, 1966 L. V. WISE ETAL 3,230,808

AUTOMATIC TRIMMER FOR EDGE-PUNCHED CARDS

Filed Nov. 9, 1962 4 Sheets-Sheet 3

INVENTORS
LESTER V. WISE
RICHARD HERMANOWSKI
DANIEL MANTELL
BY
[signature]
ATTORNEY

AUTOMATIC TRIMMER FOR EDGE-PUNCHED CARDS

INVENTORS
LESTER V. WISE
RICHARD HERMANOWSKI
DANIEL MANTELL
BY
[signature]
ATTORNEY

3,230,808
AUTOMATIC TRIMMER FOR EDGE-PUNCHED CARDS

Lester V. Wise, Plainview, Richard W. Hermanowski, Elmhurst, and Daniel L. Mantell, Lindenhurst, N.Y., assignors to Printers Progress, Inc., Brooklyn, N.Y., a corporation of New York Filed Nov. 9, 1962, Ser. No. 236,640
2 Claims. (Cl. 83—211)

This invention relates to an automatic cutting machine for cutting apart individual cards or a series of cards from a continuous web or string thereof, and more particularly to a device adapted automatically to trim the leading edge of selected edge-punched coded cards.

In many modern data processing systems, whenever data is produced, it is simultaneously code-punched into tape or onto cards for further processing by code-sensing mechanisms. One widely used machine for this purpose is the Friden "Flexowriter," which is an automatic writing machine adapted to read punched tape or edge-punched cards and automatically to write documents. At the same time, the machine produces one or more by-product punched tapes or coded cards for further processing. In this way, once the data is converted from alpha-numeric into coded form, it need never again be manually typed.

Edge-punched cards in continuous web form, with a line of perforations between successive cards, are now commonly used in conjunction with Flexowriters and other automatic data processing machines. It is possible with a continuous strip of this type to code the tickets or cards one after the other without interruption in the machine, and after the operation is completed to separate the tickets as desired. Such continuous cards have many advantages over individual tickets and can be handled more efficiently. Also, where the data is extensive and cannot be coded onto a single card, one may code the data onto a series of interconnected cards.

However, the requirements of Flexowriters and similar machines are such that in order to read the edge-coded cards, a precise trim must first be taken at the leading edge of each card or, in the event the data appears on a series of interconnected cards, on the first card in the series. The conventional practice is to tear apart the cards along the lines of perforation, but this leaves relatively rough and uneven edges. Inasmuch as the leading edges constitute a reference or guide line in the machine, the cards cannot be effectively manipulated unless these edges are first trimmed precisely, otherwise operational errors will arise.

Such trimming of the leading edges is ordinarily effected by means of manually-operated cutters. The operator first tears apart the cards from the continuous string thereof and then places the leading edge of each card in the cutter for hand trimming by a knife. This obviously is both a tedious and time-consuming operation, which adds to the expense of the system and tends therefore to discourage the use of continuous tickets. In other cases, the manual trimming is carried out directly from the string of cards, but this operation also has the same disadvantages.

In our co-pending application, Serial No. 169,215, filed January 29, 1962, now abandoned, there is disclosed a trimming machine in which a continuous string of cards is advanced intermittently along a guide channel to align the leading edge of each card with a cutting mechanism which is actuated in accordance with a coded instruction on the aligned card whereby individual cards are trimmed or the leading edge in a series of cards is trimmed, depending on the nature of the instructions.

The automatic trimmer disclosed in our co-pending case is adapted to function in response to a special code which is entered into the first code position on the card to be trimmed. In practice, this means that the operator of the Flexowriter or similar machine must be sure to punch the special code combination on the card to be trimmed, as well as entering data in punch form in the succeeding code positions. Thus when this card is later conveyed through the trimmer, a trim action will take place when the special code is sensed.

The primary object of the instant invention is to provide an improved automatic trimmer for cutting a continuous string of edge-punched cards into individual cards or into a series of code-related cards, while at the same time precisely trimming the leading edge of each individual card or the first card in a series thereof, which improved trimmer functions without the need to enter a special code on the cards to be trimmed.

The present invention is based on the fact that the last code position on a card is left vacant when the message on that card has come to an end, and therefore the next perforation line should be precision-trimmed. Since the existence of a punched hole in any one of the channels in the last code position signifies that the message is being continued over to the next card, the presence of a code in the last code position indicates that the trimmer is to skip the next perforation.

It is therefore an object of this invention to provide an automatic trimmer which senses the intermittently advanced cards to determine the presence or absence of one or more punches at the last code position, and brings about actuation of the trimmer knife only when a code is lacking.

More specifically, it is an object of this invention to provide an automatic trimmer operating in a two-pause system whereby first the card string is halted with the last code position on one card located at a sensing station to check whether the card should be trimmed or not. Then the card is shifted to the trim station where it is precision-trimmed during the second pause unless a code was sensed in the first pause.

A feature of the invention resides in a control hole microswitch which acts to sense whether the control hole on a card is not in its normal position due to an operator's error or a machine malfunction, the microswitch operating to prevent the trimming action and to stop the machine. This safety feature obviates the possibility that a set of coded cards will be trimmed incorrectly before the operator realizes an error is being made.

Another object of the invention is to provide an automatic trimmer which comes to a halt when the last card in a pack is reached.

For a better understanding of the invention, as well as other objects and further features thereof, reference is made to the following detailed description to be read in conjunction with the accompanying drawing wherein like components are designated by like reference numerals. In the drawings.

Figures 1, 3:
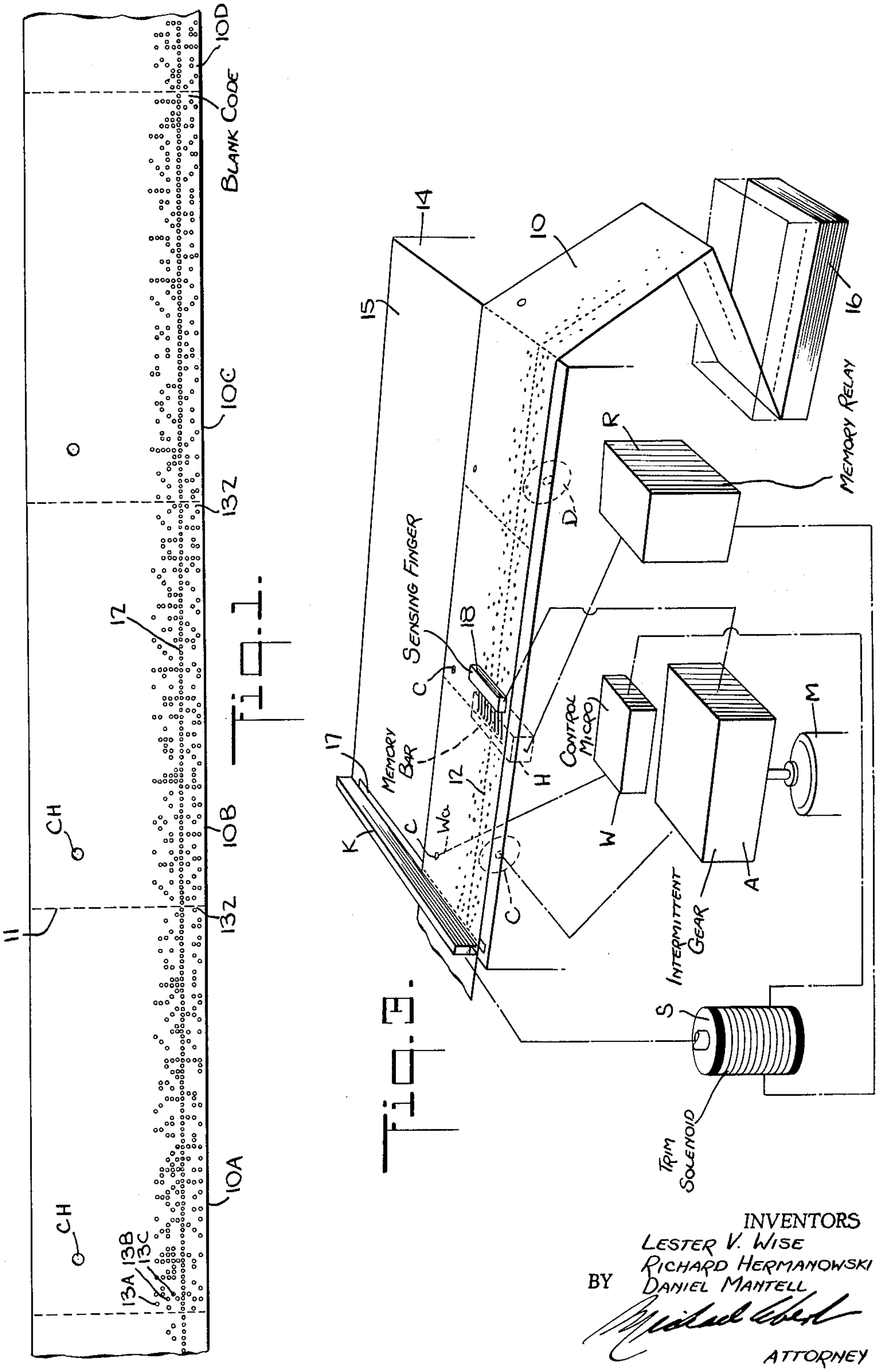
FIG. 1 illustrates a string of edge-coded cards.
FIG. 3 is a schematic sketch explanatory of the functioning of the automatic trimmer in accordance with the invention.

Referring now to the drawings, and more particularly to FIG. 1, a typical continuous web 10 of edge-punched cards is shown constituted by cards 10A, 10B, 10C, etc., which are interconnected, the web at equispaced points being provided with transverse lines 11 of perforation to facilitate folding and separation of the cards. In practice, the cards are accordion-folded along the perforation line to form a convenient stack.

Extending longitudinally along the web, adjacent the lower edge thereof is a continuous line of sprocket holes 12. Punched along the lower edge of each card are successive vertical columns 13A, 13B, 13C to 13Z, etc., of holes. An eight-place code is shown by way of illustration. That is to say, for each vertical column a maximum of eight holes may be punched and the code is made up of permutations of punches and no-punches.

If, for example, a punch is represented by numeral "1" and no-punch by "0," typical code configurations would be 00000001, 01010110, 11110101, etc., each indicative of a different value. Three of the punch positions lie below the sprocket hole line 12 and five above. In practice, the code is read by means of eight sensing fingers which are adapted to penetrate through corresponding punch positions, the fingers cooperating with electrical switches whose actuation depends on the presence of punch holes. Hence at any code position, the number of switches actuated and their relative code positions determine the sensed code value which may be translated into electrical pulses for purposes of processing. As is well known, sensing may also be carried out optically.

The code columns extend the full length of the card from the leading edge to the trailing edge thereof, unless the message is completed on the card, in which event the last code column is left blank, that is, unpunched. But if the message is continued, the last column is punched and the next code combination is punched into the first column of the succeeding card on the string, in which case there is a code combination punched on either side of the line of perforations between the two cards.

Figures 2, 5:
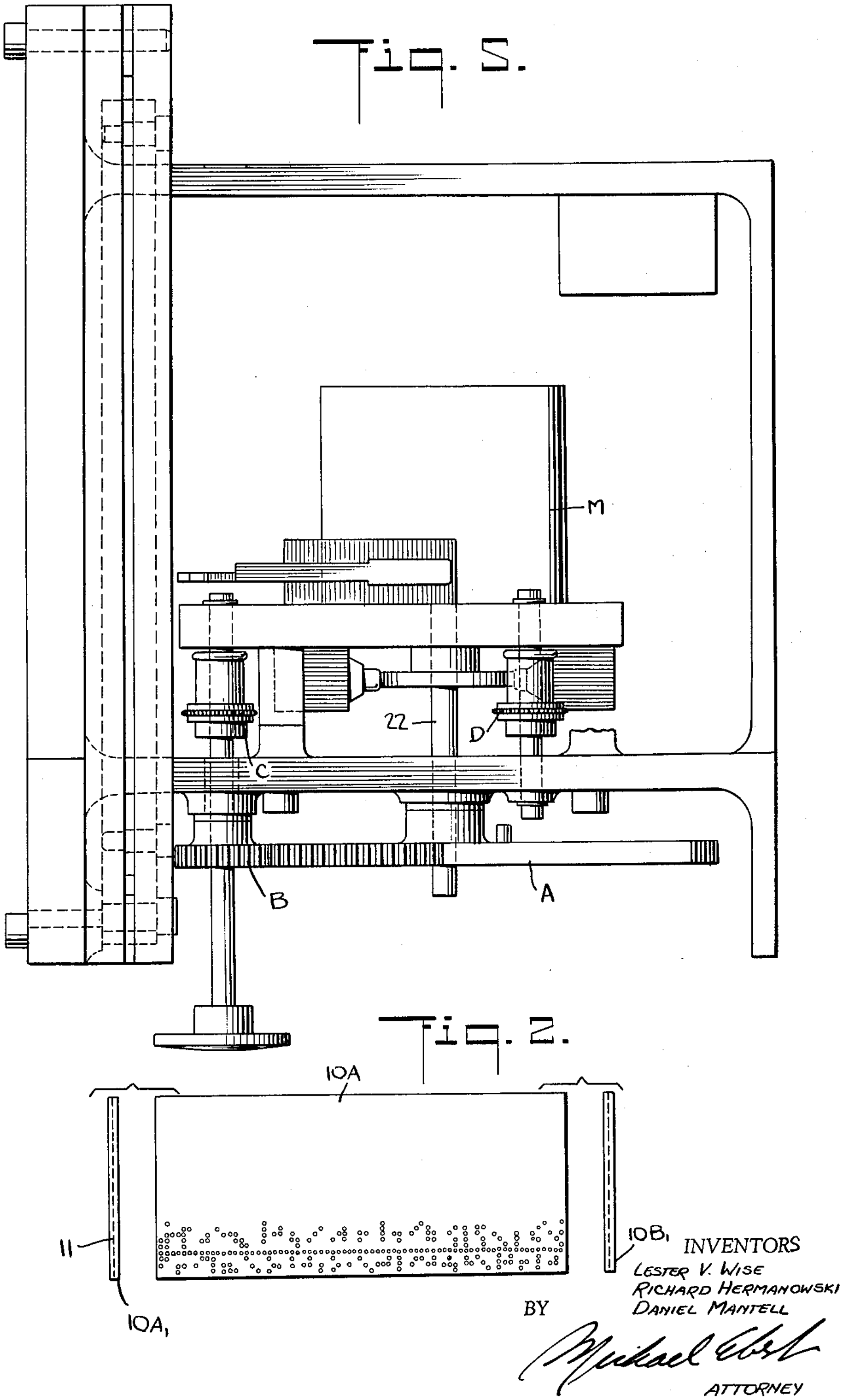
FIG. 2 shows a trimmed card.
FIG. 5 is a plan view with the top plate of the machine removed.

As pointed out previously, if one were to cut the web along the line of perforations, the resultant cards would have fairly rough leading and trailing edges. It is important for purposes of data processing that at least the leading edge be precisely defined. In accordance with the invention, a card such as 10A is trimmed, as shown in FIG. 2, by slicing a small section 10A$_1$ from the leading edge, which section includes the line of perforation 11 so as to leave a sharply defined and uniform leading edge. Of course, in slicing off the section, this not only provides a clean leading edge but also a clean trailing edge for the preceding card in the series, as would be the case in slicing off leading edge section 10B$_1$ of the next card which necessarily trims the trailing edge of card 10A.

The last code column 13Z of each card, which is adjacent the perforation 11, is employed for trimming instruction with respect to the succeeding card. That is to say, if the leading edge of a particular card is to be trimmed, this fact is indicated by the absence of punch holes in the last code position of the preceding card, which absence is sensed to provide trimming instruction.

Each card is also provided with a guide or control hole CH, this hole being relatively large and being located adjacent the leading edge of the card and well above the code columns. This control hole is used in the trimmer to check the position of the card and to prevent trimming should the card be misaligned, the machine being stopped to permit realignment.

Figure 4:
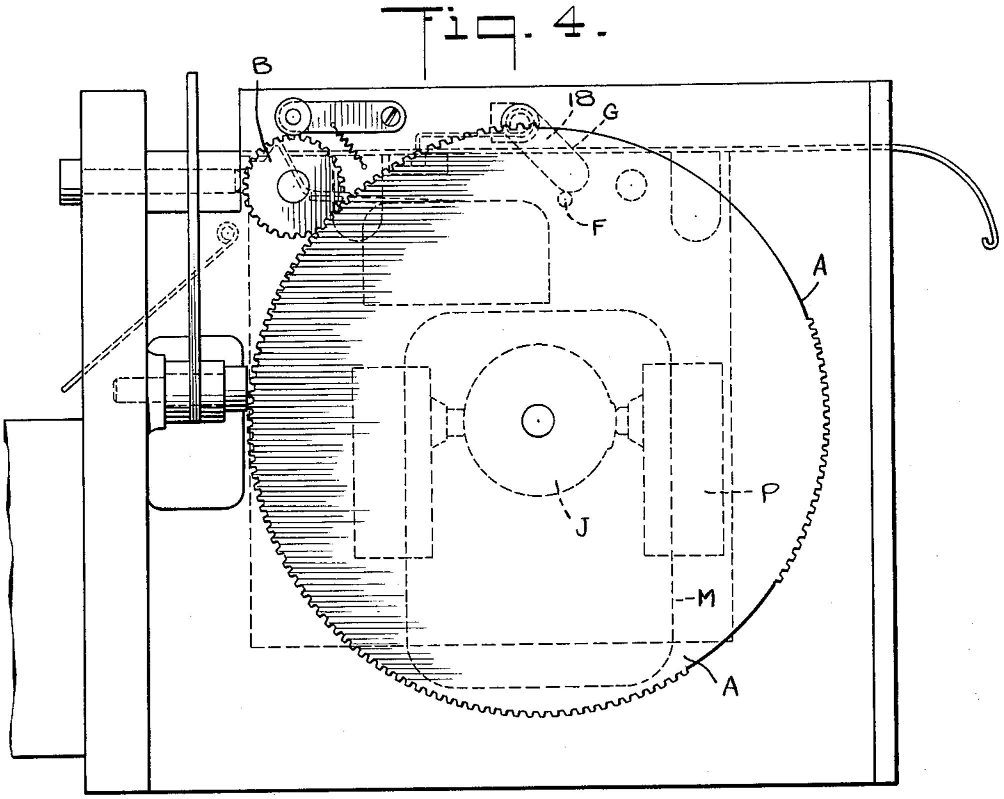
FIG. 4 is a front elevational view of the actual machine.
Figure 6:
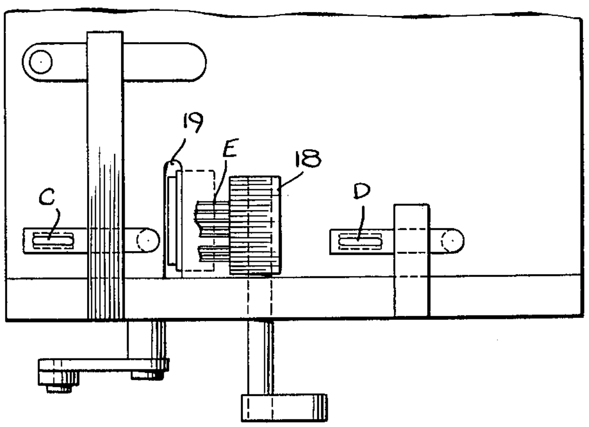
FIG. 6 shows the top plate separately.

Let us now turn to the schematic representation in FIG. 3 and to the structural views in FIGS. 4, 5 and 6 to see how the automatic trimmer effects a trimming action. The trimmer includes a frame 14 having a rectangular top platform 15. The continuous web 10 of cards is initially accordion-folded on the perforation lines and withdrawn from a tray 16 adjacent the frame, the cards being drawn across the platform.

The trimmer is provided with a driven sprocket wheel C whose teeth project above the platform through a slot therein to engage the sprocket holes 12 and thereby advance the cards. Wheel C is driven intermittently by gear A through pinion B. A second sprocket wheel D is free-wheeling and serves to keep the card in proper alignment with the cutting knife.

The sprocket wheel C is rotated by means of a traversing mechanism including the gear A which is driven by a motor M which is adapted to effect an intermittent advance of the cards and to stop each card so that its line of perforation at the leading edge is aligned in the center of a transverse slot 17 adjacent the front end of the platform, this being the trim station. Pivotally mounted on the platform is a double-bladed cutting knife K having a flat cutting edge which is receivable within slot 17 to effect a cutting action when a trim signal is received, the width of the knife edge being adapted to cut off a small section of the card, such as section 10A, in FIG. 2. The knife is actuated by an electrically-energized solenoid S. The waste sections fall through the slot 17 to be collected therebelow for disposal.

Pivotally mounted on the platform is an array of sensing fingers E projecting from a bank 18, the fingers being normally held above the card in alignment with the last code position thereon. A slot 19 is formed in the platform below the fingers, and supported below the slot in alignment with the fingers is a memory contact bar H adapted to be engaged by those fingers which penetrate through holes in the cards. Assuming an eight-place code, there will be eight fingers. In the event that a code is punched at the last code position on the card, those fingers associated with holes will penetrate the card to make contact with the bar H and complete a circuit, one or more fingers finding holes, depending on the code combination. If, however, the last code position is blank, none of the fingers enter and no contact is made with the bar.

Contact with bar H results in enegization of a memory relay R which is so connected to the circuit of solenoids as to prevent knife action. If no punched hole is found, as occurs with a blank at the last code position, relay R will not be energized.

After sensing the last code position, the gear A advances the card to the trim position, at which position a control hole microswitch W is actuated if the card is in its proper position, this being indicated by the microswitch arm W*a*, which is permitted to move upwardly into the hole C, thereby closing the switch. If the memory relay R at the sensing position has not been energized, thereby indicating the absence of a code at the last code position, and microswitch W has been energized, indicating the correct alignment of the card in its trim position, then solenoid S operates to trim the card.

The sequence of operations is as follows: First the sprocket wheel C is driven by gear A until the card string 10 is stopped with the last code position on a particular card in line with the sensing fingers E at the sensing station. The card pauses at this station, and the fingers are moved downwardly by a cam action of gear A to sense the absence or presence of a code at the last code position. The memory relay R is energized only if a code is present at this position.

The card is now shifted by the sprocket wheel C until the line of perforations following the last code position is in line with the trim station. The arm W*a* of the microswitch W senses the control hole C in the next card to see if the string is in line with the knife, and if this be the case and if the memory relay is unenergized, the knife K will be actuated by solenoid S to effect a precise trim.

Referring now to FIGS. 4, 5, 6 and 7, the actual structure of the automatic trimmer is shown. Drive motor M rotates continuously at a constant speed and is provided with a shaft 22 on which the main drive gear A is directly mounted. Gear A has two segments of gear teeth separated from each other in the manner indicated in the timing diagram of FIG. 9, whereby in the course of each full rotation, the sprocket wheel C driven through pinion B causes a card first to advance to the sensing position, to remain at this position until a sensing action takes place, after which the card is advanced to the trim position where it is held while the control hole is sensed and trimming takes place if such action is indicated. As pointed out previously, sprocket wheel D is free-wheeling and serves only to maintain alignment of the string.

Figure 8:
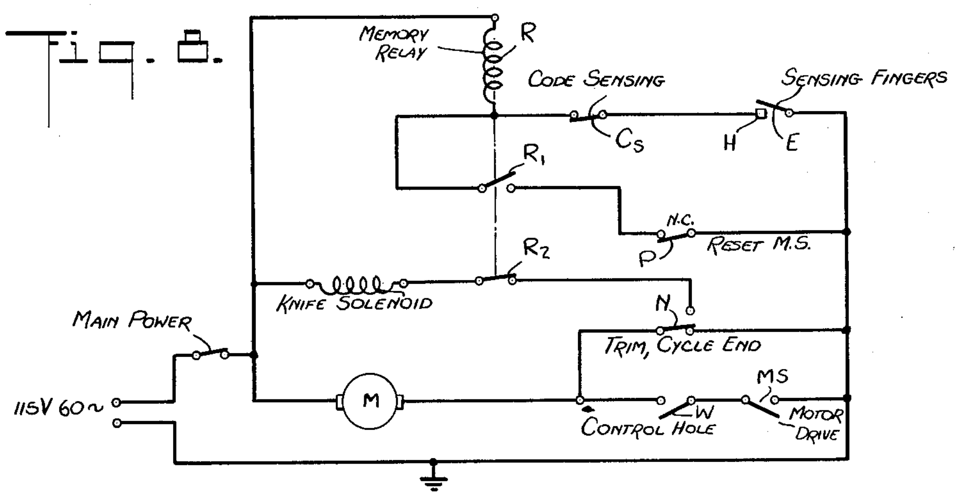
FIG. 8 is a schematic circuit diagram of the electrical circuit of the machine.

At the sensing station, the finger bank 18, which is pivotally mounted and coupled to a cam arm G, is caused momentarily to rock downwardly when a pin F on the gear A engages arm G. The action causes the fingers E to enter one or more punch holes in the last code position of the card if a code is punched therein, thereby engaging contact bar H and closing a circuit energizing the memory relay R (note FIG. 8). If relay R is energized it holds itself energized through its one holding contact, as shown in FIG. 8.

After this brief pause in the code-sensing position, gear A again meshes with pinion B and advances the card into the trim position. At this position the control hole microswitch W will be closed if the card is in its correct position, for then the control hole CH in the card following the card previously sensed, will allow microswitch arm *Wa* to move into the hole and thus bring about a switch action. At the same time, a cam J also mounted on motor shaft 22 will operate a trim microswitch N. When both switches W and N are closed simultaneously, a grounding circuit is formed for the knife solenoid S to actuate knife K and trim the card. If, however, relay R was energized, thereby indicating a no-trim signal, the normally closed relay contact $R_2$ is opened to break the solenoid circuit and prevent its actuation.

As cam J continues to turn, switch N will open and the knife solenoid will be deenergized. Then at the end of the trim pause, gear A will again drive the cards to a point at which the next card reaches the sensing station. During this movement cam J operates a re-set microswitch P which interrupts the holding circuit of contact $R_1$ and causes re-setting of memory relay R to its deenergized position, assuming it was previously energized, thereby preparing it for the next sensing cycle.

Figure 9:
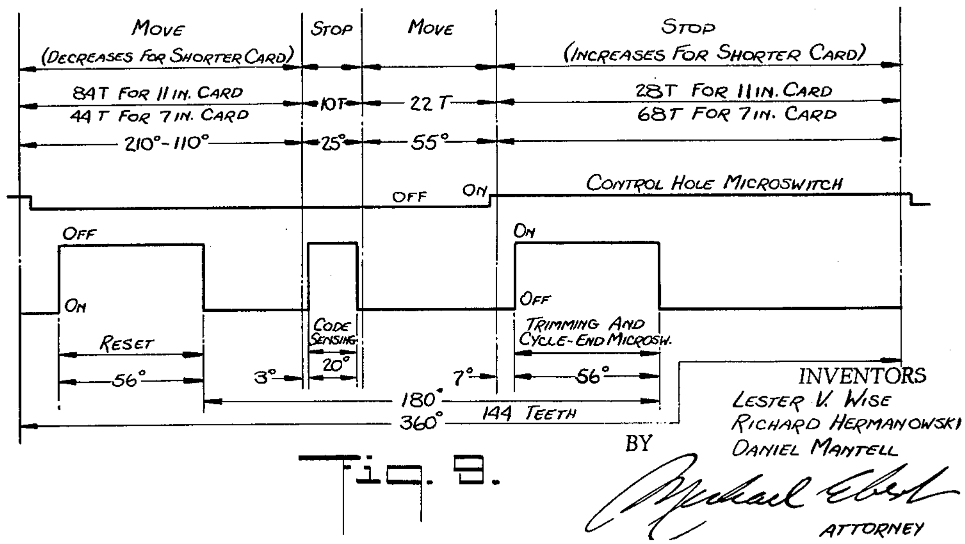
FIG. 9 is a timing diagram showing the timing relationship between the various actions in the machine for a full cycle of operation.

As shown in FIG. 9, there is also provided a code sensing switch $C_S$ in series with the sensing fingers E, to enable the operator to select the code sensing mode or render it inoperative. If code switch $C_S$ is left open, this serves to cut out the memory relay R, and as a result the trimmer will trim every card without regard to coding.

The motor drive switch MS is used to control operation of the trimmer. Regardless of when in the cycle the switch MS is thrown off, the trimmer will continue operation until just before trimming occurs, in that the trim microswitch N shunts the motor drive switch and acts as a jumper therefor until cam J opens it. This stops the motor, and as there is no ground circuit for the knife solenoid, the operation stops at this point. However, since power was not removed from the memory relay R, it will hold its signal indefinitely. When the motor drive switch MS is thereafter turned on, the cycle will continue as though there had been no interruption. Thus the machine operation can be stopped without loss of a coded card. It will be seen, therefore, that microswitch N does double duty as a "Trim" switch and also as a "Cycle End" switch.

Another useful feature of the machine is that it stops automatically at the end of a pack of cards. This is accomplished by means of the control hole microswitch W. When the last card in the pack moves through the trimmer, it will be driven by sprocket wheel C until the last sprocket hole in the card is shifted beyond wheel C. The driving mechanism will continue its cycle but the card will stop with approximately the last inch of its length still in the trimmer because the rear end of the card holds the microswitch down. When the cycle reaches the trim pause, the control microswitch W will still be open, for there will be no card present containing a control hole, and this will stop the cycle just as though the control hole were in the incorrect position due to machine failure or operator error. At the operator's convenience, the motor drive switch MS is turned off and the last card pulled from the trimmer. The trimmer is now ready for a new card pack.

Figure 7:
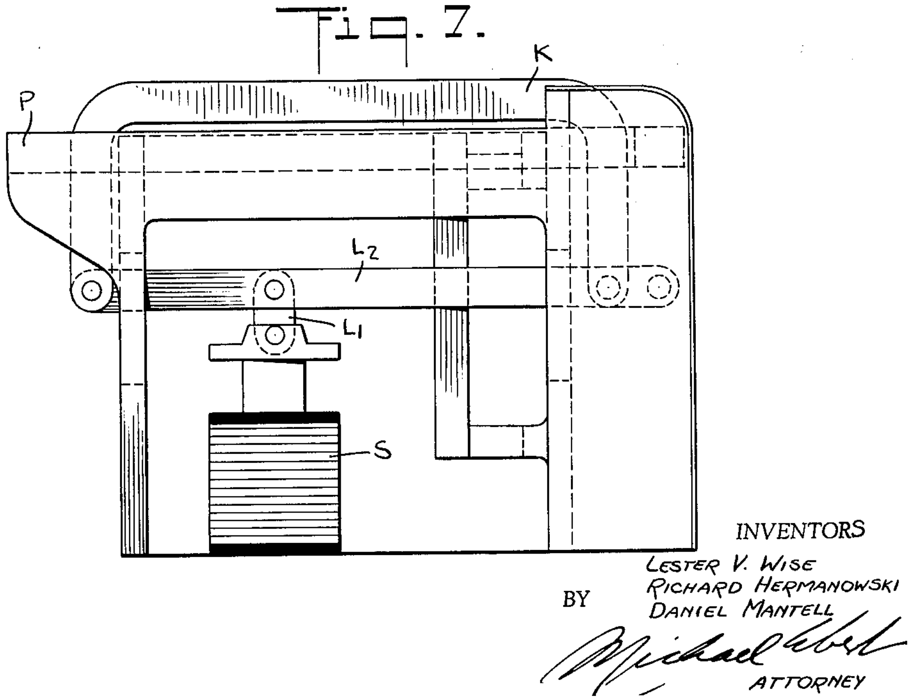
FIG. 7 is an end view of the machine, showing the cutting knife arrangement.

Another feature of the invention resides in the floating knife design, as shown in FIG. 7. In the arrangement shown in the above-identified co-pending application, the moving knife pivoted about a fixed point and moved between fixed dies with very little clearance allowed, in order to obtain an effective cutting action. This required highly accurate machining and assembly, so that the knife would slide between the lines without bending or burring the die edges upon entry.

In the present arrangement, the U-shaped knife K is always engaged between dies D and is not restricted in its movement by fixed pivots or supports. The pulling force of solenoid S is transmitted through loose connecting links $L_1$ and $L_2$, so that as the knife is drawn downwardly it may adjust itself sideways so as to slip between the dies with the least resistance. This method greatly reduces machining and assembly tolerance of the parts, and consequently the cost of the unit. It also minimizes maintenance, for it decreases knife and die wear and self-compensates for any slight warping of the parts.

While there has been shown what is believed to be a preferred embodiment of the safety trimmer in accordance with the invention, it will be appreciated that many changes and modifications may be made therein without departing from the essential spirit of the invention as set forth in the annexed claims.

What is claimed is:

1. A non-consecutive automatic trimmer for a continuous web of cards whose junctions are defined by transverse lines of perforations, each card having a longitudinal series of punch-hole code positions and a control hole, each code position in the longitudinal series thereof being constituted by a transverse column having a predetermined number of hole places, a data message being formed by the code positions extending along one or more cards and the conclusion of the data message being represented on the last of these cards by the absence of punch holes at any place in the column in the last code position thereon, said trimmer comprising a platform having a cutting station provided with cutting means, a sensing station provided with sensing means, and control-hole check means, means intermittently advancing said web along said platform whereby each card first pauses at said sensing station to register the last code position thereon with said sensing means and then pauses at said cutting station to register the transverse line with said cutting means, and to register said control hole with said check means in the event said card is properly aligned, said sensing means subject to the actuation of said check means producing a signal only in the absence of punch holes at any place in the column in the last code position, and means responsive to said signal to activate said cutting means when said card pauses at said cutting station.

2. A trimmer as set forth in claim 1, including means controlled by said check means to arrest the operation of said trimmer in the event the control hole is out of registration.

References Cited by the Examiner

UNITED STATES PATENTS

| | | | |
|---|---|---|---|
| 308,119 | 11/1884 | White | 83—275 |
| 390,018 | 9/1888 | Harrison | 83—275 |

(Other references on following page)

UNITED STATES PATENTS

| | | | |
|---|---|---|---|
| 2,156,015 | 4/1939 | Greiner. | |
| 2,522,946 | 9/1950 | Gooderham | 234—28 |
| 2,595,889 | 5/1952 | Ryffel et al. | 234—29 |
| 2,728,392 | 12/1955 | Marsh et al. | 83—211 |
| 3,093,020 | 6/1963 | Walsh | 83—106 |
| 3,116,658 | 1/1964 | Baker | 83—419 |
| 3,143,017 | 4/1964 | Donnell | 83—211 |

WILLIAM W. DYER, Jr., *Primary Examiner.*

HUNTER C. BOURNE, Jr., ANDREW R. JUHASZ, *Examiners.*